US007317187B2

(12) United States Patent
Davidson et al.

(10) Patent No.: US 7,317,187 B2
(45) Date of Patent: Jan. 8, 2008

(54) FRONTAL AFFINITY CHROMATOGRAPHY/MALDI TANDEM MASS SPECTROMETRY

(76) Inventors: William R. Davidson, 122 Glencameron Road, Thornhill, Ontario (CA) L3T 1P8; Bori Shushan, 164 Glen Road, Toronto, Ontario (CA) M4W 2W6; Peter Kovarik, 70 Miramar Drive, Markham, Ontario (CA) L6E 1Z9; Tom R. Covey, 203 Pleasant Avenue, Dundas, Ontario (CA) 39H 3V5; John D. Brennan, 187 Elgin Mills Road West, Dundas, Ontario (CA) 39H 3V5

( * ) Notice: Subject to any disclaimer, the term of this patent is extended or adjusted under 35 U.S.C. 154(b) by 0 days.

(21) Appl. No.: 11/135,490

(22) Filed: May 24, 2005

(65) Prior Publication Data

US 2005/0269507 A1 Dec. 8, 2005

Related U.S. Application Data

(63) Continuation-in-part of application No. 11/133,443, filed on May 20, 2005.

(60) Provisional application No. 60/573,009, filed on May 21, 2004.

(51) Int. Cl.
*B01D 59/44* (2006.01)

(52) U.S. Cl. ...................... 250/288; 250/281; 250/282; 250/287; 436/161; 436/7.1; 436/7.2; 210/198.2; 210/635

(58) Field of Classification Search ..................... None
See application file for complete search history.

(56) References Cited

U.S. PATENT DOCUMENTS 6,175,112 B1 * 1/2001 Karger et al. ............... 250/288
6,627,453 B1 * 9/2003 Hindsgaul et al. .......... 436/161
6,723,235 B2 * 4/2004 Hindsgaul et al. ....... 210/198.2
2002/0150535 A1 10/2002 Madras et al.

FOREIGN PATENT DOCUMENTS

WO WO 02/062475 8/2002

(Continued)

OTHER PUBLICATIONS

Walker, Kathleen L., et al., "Off-Line Coupling of Capillary Electrophoresis and Matrix-Assisted Laser Desorption/Ionization Time-of-Flight Mass Spectrometry". Analytical Chemistry, vol. 67, No. 22, pp. 4197-4204, 1995.

(Continued)

*Primary Examiner*—Jack Berman
*Assistant Examiner*—Zia R. Hashmi
(74) *Attorney, Agent, or Firm*—Patricia Folkins; Bereskin & Parr

(57) ABSTRACT

Sol-gel derived monolithic silica columns containing entrapped dihydrofolate reductase were used for frontal affinity chromatography of small molecule mixtures. The output from the column combined with a second stream containing the matrix molecule (HCCA) and was directly deposited onto a conventional MALDI plate that moved relative to the column via a computer controlled x-y stage, creating a semi-permanent record of the FAC run. The use of MALDI MS allowed for a decoupling of the FAC and MS methods allowing significantly higher ionic strength buffers to be used for FAC studies, which allowed for better retention of protein activity over multiple runs.

20 Claims, 10 Drawing Sheets

FOREIGN PATENT DOCUMENTS

WO WO 2005/028710 3/2005

OTHER PUBLICATIONS

Hage, David S., "Survey of Recent Advances in Analytical Applications of Immunoaffinity Chromatography", Journal of Chromatography B, vol. 715, pp. 3-28, 1998.
Hage, David S., "Affinity Chromatography: A Review of Clinical Applications", Clinical Chemistry, vol. 45, No. 5, pp. 593-615, 1999.
Muronetz, Vladimir I., et al., "Use of Protein-Protein Interactions in Affinity Chromatography", Journal of Biochemical and Biophysical Methods, vol. 49, pp. 29-47, 2001.
Baczek, Tomasz., et al., "Quantitative Structure/Retention Relationships in Affinity Chromatography", Journal of Biochemical and Biophysical Methods, vol. 49, pp. 83-98, 2001.
Burgess, Richard R., et al., "Advances in Gentle Immunoaffinity Chromatography", Protein Technologies and Commercial Enzymes, pp. 304-308.
Hage, David S., et al., "Characterization of the Protein Binding of Chiral Drugs by High-Performance Affinity Chromatography Interactions of R- and S-Ibuprofen with Human Serum Albumin", Journal of Chromatography A., vol. 693, pp. 23-32, 1995.
Hofstetter, Heike, et al., "Enantiomer Separation Using BSA as Chiral Stationary Phase in Affinity OTEC and OTLC", Journal of Microcolumn Separations, vol. 10. No. 3, pp. 287-291, 1998.
Hofstetter, Oliver, et al., "Direct Resolution of Enantiomers in High-Performance Immunoaffinity Chromatography Under Isocratic Conditions", Analytical Chemistry, vol. 74, No. 9, pp. 2119-2125, 2002.
Fitos, I., et al., "Species-Dependency in Chiral-Drug Recognition of Serum Albumin Studied by Chromatographic Methods", Journal of Biochemical and Biophysical Methods, vol. 54, pp. 71-84, 2002.
Hsieh, Frank Y.L., et al., "Automated Analytical System for the Examination of Protein Primary Structure", Analytical Chemistry, vol. 68, No. 3, pp. 455-462, 1996.
Wang, Can, et al., "Integration of Immobilized Trypsin Bead Beds for Protein Digestion Within a Microfluidic Chip Incorporating Capillary Electrophoresis Separations and an Electrospray Mass Spectrometry Interface", Rapid Communications in Mass Spectrometry, vol. 14, pp. 1377-1383, 2000.
Wang, Shihong, et al., "Proteolysis of Whole Cell Extracts with Immobilized Enzyme Columns as Part of Multidimensional Chromatography", Journal of Chromatography A, vol. 913, pp. 429-436, 2001.
Peterson, Dominic S., et al., "High-Throughput Peptide Mass Mapping Using a Microdevice Containing Trypsin Immobilized on a Porous Polymer Monolith Coupled to MALDI TOF and ESI TOF Mass Spectrometers", Journal of Proteome Research, vol. 1, pp. 563-568, 2002.
Peterson, Dominic S., et al., "Enzymatic Microreactor-on-a-Chip: Protein Mapping Using Trypsin Immobilized on Porous Polymer Monoliths Molded in Channels of Microfluidic Devices", Analytical Chemistry, vol. 74, No. 16, pp. 4081-4088, 2002.
Slysz, Gordon, W., et al., "On-Column Digestion of Proteins in Aqueous-Organic Solvents", Rapid Communications in Mass Spectrometry, vol. 17, pp. 1044-1050, 2003.
Zhang, Boyan, et al., "Frontal Affinity Chromatography Coupled to Mass Spectrometry for Screening Mixtures of Enzyme Inhibitors", Analytical Biochemistry, vol. 299, pp. 173-182, 2001.
Baynham, Michael T., et al., "Multidimensional On-Line Screening for Ligands to the $\alpha 3\beta 4$ Neuronal Nicotinic Acetylcholine Receptor Using an Immobilized Nicotinic Receptor Liquid Chromatographic Stationary Phase", Journal of Chromatography B, vol. 772, pp. 155-161, 2002.
Moaddel, Ruin, et al., "Immobilized Receptor-and Transporter-Based Liquid Chromatographic Phases for On-Line Pharmacological and Biochemical Studies: a Mini-Review", Journal of Chromatography B, vol. 768, pp. 41-53, 2002.
Moaddel, Ruin, et al., "Multiple Receptor Liquid Chromatographic Stationary Phases: The Co-Immobilization of Nicotinic Receptors, $\gamma$-Amino-Butyric Acid Receptors, and N-Methyl D-Aspartate Receptors", Pharmaceutical Research. vol. 19, No. 1, pp. 104-107, 2002.
Moaddel, Ruin, et al., "Immobilized Nicotinic Receptor Stationary Phases: Going with the Flow in High-Throughput Screening and Pharmacological Studies", Journal of Pharmaceutical and Biomedical Analysis, vol. 30, pp. 1715-1724, 2003.
Hodgson, Richard J., et al., "Capillary-Scale Monolithic Immunoaffinity Columns for Immunoextraction with In-Line Laser-Induced Fluorescence Detection", Analytical Chemistry, vol. 77, No. 14, pp. 4404-4412, 2005.
Hodgson, Richard J., et al., "Protein-Doped Monolithic Silica Columns for Capillary Liquid Chromatography Prepared by the Sol-Gel Method: Applications to Frontal Affinity Chromatography", Analytical Chemistry, vol. 76, No. 10, pp. 2780-2790, 2004.
Annesley, Thomas M., "Ion Suppression in Mass Spectrometry", Clinical Chemistry vol. 49, No. 7, pp. 1041-1044, 2003.
Zuberovic, Aida, et al., "Capillary Electrophoresis Off-Line Matrix-Assisted Laser Desorption/Ionisation Mass Spectrometry in Intact and Digested Proteins Using Cationic-Coated Capillaries", Rapid Communications in Mass Spectrometry, vol. 18, pp. 2946-2952, 2004.
Tegeler, Tony, J., et al., "Microdeposition Device Interfacing Capillary Electrochromatography and Microcolumn Liquid Chromatography with Matrix-Assisted Laser Desorption/Ionization Mass Spectrometry", Analytical Chemistry, vol. 76, No. 22, pp. 6698-6706, 2004.
Weinmann, Wolfgang, et al., "Capillary Electrophoresis-Matrix-Assisted Laser-Desorption Ionization Mass Spectrometry of Proteins", Journal of Chromatography A, vol. 680, pp. 353-361, 1994.
Zhang, Haiying, et al., "Capillary Electrophoresis Combined with Matrix-Assisted Laser Desorption/Ionization Mass Spectrometry; Continuous Sample Deposition on a Matrix-Precoated Membrane Target", Journal of Mass Spectrometry, vol. 31, pp. 1039-1046, 1996.
Zhang, Haying, et al., "Combining Solid-Phase Preconcentration, Capillary Electrophoresis and Off-Line Matrix-Assisted Laser Desorption/Ionization Mass Spectrometry: Intracerebral Metabolic Processing of Peptide E In Vivo", Journal of Mass Spectrometry, vol. 34, pp. 377-383, 1999.
Bogan, Michael J., et al., "Preliminary Investigation of Electrodynamic Charged Droplet Processing to Couple Capillary Liquid Chromatography with Matrix-Assisted Laser Desorption/Ionization Mass Spectrometry", Rapid Communications in Mass Spectrometry, vol. 18, pp. 2673-2681, 2004.
Zhang, Boyan, et al., "Combining Liquid Chromatography with MALDI Mass Spectrometry Using a Heated Droplet Interface", Analytical Chemistry, vol. 76, No. 4, pp. 992-1001, 2004.
Miliotis, Tasso, et al., "Capillary Liquid Chromatography Interfaced to Matrix-Assisted Laser Desorption/Ionization Time-of-Flight Mass Spectrometry Using an On-Line Coupled Piezoelectric Flow-Through Microdispenser", Journal of Mass Spectrometry, vol. 35, pp. 369-377, 2000.
Miliotis, Tasso, et al., "Analysis of Regulatory Phosphorylation Sites in ZAP-70 by Capillary High-Performance Liquid Chromatography Coupled to Electrospray Ionization or Matrix-Assisted Laser Desorption Ionization Time-of-Flight Mass Spectrometry", Journal of Chromatography B, vol. 752, pp. 323-334, 2001.
Preisler, Jan, et al., "Capillary Array Electrophoresis-MALDI Mass Spectrometry Using a Vacuum Deposition Interface", Analytical Chemistry, vol. 74, No. 1, pp. 17-25, 2002.
Ericson, Christer, et al., "An Automated Noncontact Deposition Interface for Liquid Chromatography Matrix-Assisted Laser Desorption/Ionization Mass Spectrometry", Analytical Chemistry, vol. 75, No. 10, pp. 2309-2315, 2003.
Lou, Xianwen, et al., "Direct Sample Fraction Deposition Using Electrospray in Narrow-Bore Size-Exclusion Chromatography/Matrix-Assisted Laser Desorption/Ionization Time-of-Flight Mass Spectrometry for Polymer Characterization", Journal of Mass Spectrometry, vol. 35, pp. 1308-1312, 2000.
Fung, Kim Y.C., et al., "A simple and Inexpensive Approach to Interfacing High-Performance Liquid Chromatography and Matrix- Assisted Laser Desorption/Ionization—Time of Flight—Mass Spectrometry", Proteomics, vol. 4, pp. 3121-3127, 2004.
Wall, Daniel B., et al., "Continuous Sample Deposition From Reversed-Phase Liquid Chromatography to Tracks on a Matrix-Assisted Laser Desorption/Ionization Precoated Target for the Analysis of Protein Digests", Electrophoresis, vol. 23, pp. 3193-3204, 2002.
Brook, Michael A., et al., "Proteins Entrapped in Silica Monoliths Prepared from Glyceroxysilanes", Journal of Sol-Gel Science and Technology, vol. 31, pp. 343-348, 2004.
Zolli-Juran, Michela, et al., "Hight Throughput Screening Identifies Novel Inhibitors of *Escherichia coli* Dihydrofolate Reductase that are Competitive with Dihydrofotale", Bioorganic & Medicinal Chemistry Letters, vol. 13, pp. 2493-2496, 2003.
Besanger, Travis, R., et al., "Screening of Inhibitors Using Enzymes Entrapped in Sol-Gel Derived Materials", Analytical Chemistry, vol. 75, No. 10, pp. 2382-2391, 2003.
King, Richard, et al., "Mechanistic Investigation of Ionization Suppression in Electrospray Ionization", American Society for Mass Spectrometry, vol. 11, pp. 942-950, 2000.
Matuszewski, B.K., et al., "Matrix Effect in Quantitative LC/MS/MS Analyses of Biological Fluids: A Method for Determination of Finasteride in Human Plasma at Picogram Per Milliliter Concentrations", Analytical Chemistry, vol. 70, No. 5, pp. 882-889, 1998.
Krause, Eberhard, et al., "The Dominance of Arginine-Containing Peptides in MALDI-Derived Tryptic Mass Fingerprints of Proteins", Analytical Chemistry, vol. 71, No. 19, pp. 4160-4165, 1999.
Gharahdaghi, Farzin, et al., "Peptide-Mass Profiles of Polyvinylidene Difluoride-Bound Proteins by Matrix-Assisted Laser Desorption/Ionization Time-of-Flight Mass Spectrometry in the Presence of Nonionic Detargents", Analytical Biochemistry, vol. 233, pp. 94-99, 1996.
Besanger, Travis R., et al., "Entrapment of Highly Active Membrane-Bound Receptors in Macroporous Sol-Gel Derived Silica", Analytical Chemistry, vol. 76, No. 21, pp. 6470-6475, 2004.
Chen, Hsuan-shen, et al., "High-Speed, High-Resolution Monolithic Capillary LC-MALDI MS Using an Off-Line Continuous Deposition Interface for Proteomic Analysis", Analytical Chemistry, vol. 77, No. 8, pp. 2323-2331, 2005.
Domino, Edward F., "Relative Potency and Efficacy of Some Dopamine Agonists with Varying Selectivities for $D_1$ and $D_2$ Receptors in MPTP-Induced Hemiparkinsonian Monkeys", The Journal of Pharmacology and Experimental Therapeutics, vol. 265, No. 3, pp. 1387-1391, 1993.
Bowery, B., et al., "Comparison Between the Pharmacology of Dopamine Receptors Mediating the Inhibition of Cell Firing in Rat Brain Slices Though the Substantia Nigra Pars Compacta and Ventral Tegmental Area", Br. J. Pharmacol., vol. 112, pp. 873-880, 1994.
Lieberman, Abraham, et al., "MK 458, A Selective and Potent $D_2$ Receptor Agonist in Advanced Parkinson's Disease", Clinical Neuropharmacology, vol. 11, No. 3, pp. 191-200, 1988.
Ahlskog, Eric J., et al., "Parkinson's Disease Monotherapy With Controlled-Release MK-458 (PHNO): Double-Blind Study and Comparison to Carbidopa/Levodopa", Clinical Neuropharmacology, vol. 14, No. 3, pp. 214-227, 1991.
Cedarbaum, Jesse M., et al., "Sustained-Release (+)-PHNO [MK-458 (HPMC)] in the Treatment of Parkinson's Disease: Evidence for Tolerance to a Selective $D_2$-Receptor Agonist Administered as a Long-Acting Formulation", Movement Disorders, vol. 5, No. 4, pp. 298-303, 1990.
Paul, Carl et al., "LC-MALDI: Increase Analytical Throughput Using a Parakkek Separations Strategy", 2003 ASMS Proceedings.
Schriemer, David C., et al., "Micro-Scale Frontal Affinity Chromatography with Mass Spectrometric Detection: A New Method for the Screening of Compound Libraries", Agnew. Chem. Int. Ed., vol. 37, No. 24, pp. 3383-3387, 1998.

* cited by examiner (ESI FIGURE)

A

B

C

FRONTAL AFFINITY CHROMATOGRAPHY/MALDI TANDEM MASS SPECTROMETRY

This application is a continuation-in-part of U.S. patent application Ser. No. 11/133,443 filed on May 20, 2005 which claims the benefit under 35 USC 119(e) from U.S. Provisional Patent Application Ser. No. 60/573,009, filed on May 21, 2004, the contents of both of which are incorporated herein by reference.

FIELD OF THE INVENTION

The present invention relates to methods of analyzing compounds from chromatographic analyses, in particular using mass spectrometry.

BACKGROUND TO THE INVENTION

Bioaffinity chromatography has been widely used for sample purification and cleanup,[1] chiral separations,[2] on-line proteolytic digestion of proteins,[3] development of supported biocatalysts,[4] and more recently for screening of compound libraries[5,6] via the frontal affinity chromatography (FAC) method. The basic premise of FAC is that continuous infusion of a compound will allow for equilibration of the ligand between the free and bound states, where the precise concentration of free ligand is known. In this case, the breakthrough time of the compound will correspond to the affinity of the ligand for the immobilized biomolecule—ligands with higher affinity will break through later.

The detection of compounds eluting from the column can be accomplished using methods such as fluorescence,[7] radioactivity,[6] or electrospray mass spectrometry.[5] The former two methods usually make use of either a labeled library, or use a labeled indicator compound which competes against known unlabelled compounds, getting displaced earlier if a stronger binding ligand is present. However, in each case the methods have limited versatility owing to the need to obtain labeled compounds, and the need for prior knowledge of compounds used in the assay, since no structural information is provided by the detector. Hence, fluorimetric and radiometric methods tend to be useful only for analysis of discrete compounds.

Interfacing of FAC to ESI-MS, on the other hand, has proven to be a very versatile method for screening of compound mixtures.[5] Use of MS, and in particular MS/MS detection, provides the opportunity to obtain structural information on a variety of compounds simultaneously. In cases where the identity of compounds in the mixture is known, the analytes can be detected simultaneously and in a quantitative manner using the multiple reaction monitoring (MRM) mode, improving the throughput of the method. While this unique aspect of the FAC/MS technique has been touted as a major advantage for applications such as high-throughput screening of compound mixtures,[5,8] there are some potential disadvantages that arise as a result of the use of electrospray ionization for introduction of compounds into the mass spectrometer. For example, obtaining a stable electrospray requires the use of a low ionic strength eluent, which in some cases can be incompatible with maintaining the activity of the proteins immobilized in the column.[9] Low ionic strength can also lead to an ineffective double layer, which can cause significant non-selective binding through electrostatic interactions of compounds with the silica column. Furthermore, only one mode of analysis is possible per chromatographic run when using ESI/MS. Finally, high levels of analytes can lead to large ion currents in the electrospray, which can lead to ion suppression.[10]

There remains a need for a more compatible and efficient means for detecting compounds eluting from bioaffinity columns.

SUMMARY OF THE INVENTION

To overcome the above-listed problems associated with the currently used methods of detecting compounds eluting from bioaffinity columns, it is advantageous to decouple the chromatography and mass spectrometry by performing the mass spectrometric detection step off-line. This is most efficiently achieved by coupling frontal affinity chromatography (FAC) to matrix-assisted laser desorption ionization (MALDI) MS. The general approach is to deposit the FAC effluent onto a MALDI target, followed by MALDI/MS analysis. Relative to ESI, MALDI analysis has the advantages of higher tolerance to buffers, lower sample consumption per analysis and reduced analysis time. Separation of the LC and MS steps also allows independent optimization of the MS detection parameters for each analyte.

The present inventors have integrated FAC, using newly developed sol-gel derived monolithic bioaffinity columns,[9] with MALDI-MS/MS detection, and compared the operation to FAC-ESI/MS/MS by examining the ability of small enzyme inhibitors to interact with entrapped dihydrofolate reductase (DHFR) using elution at different ionic strengths. The interfacing involves mixing the column effluent with a suitable matrix followed by continuous nebulizer-assisted electrospray deposition of the mixture onto a MALDI plate that is present on a computer controlled x-y translation stage. The chromatographic trace is deposited semi-permanently onto the MALDI plate, allowing for subsequent analysis offline by MALDI/MS/MS. By scanning the laser over the tracks deposited by the column while monitoring the eluted compounds in MRM mode, the frontal chromatogram can be reconstructed directly to obtain breakthrough curves for each analyte. It is shown that MALDI/MS/MS has a number of benefits relative to ESI/MS/MS as a detection method for FAC, including: better tolerance to high ionic strength elution buffers, which helps maintain the activity of the protein in the column and reduce non-specific binding; the ability to acquire multiple MS scans from a single plate in a matter of minutes following the FAC run; and the ability to detect high levels of potential inhibitors with limited ion suppression effects. The results show that FAC/MALDI-MS is well suited for high-throughput screening of compound mixtures.

Accordingly, the present invention includes a system for analyzing chemical samples comprising a frontal affinity chromatographic column interfaced to a MALDI mass spectrometer.

The present invention also includes a method of analyzing samples from frontal affinity chromatography (FAC) comprising:

(a) combining effluent from a FAC column with a matrix;

(b) depositing the combination in (a) on to a surface; and (c) analyzing the deposited combination using MALDI mass spectrometry.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The invention will now be described in relation to the drawings in which.

DETAILED DESCRIPTION OF THE INVENTION

Figure 1:
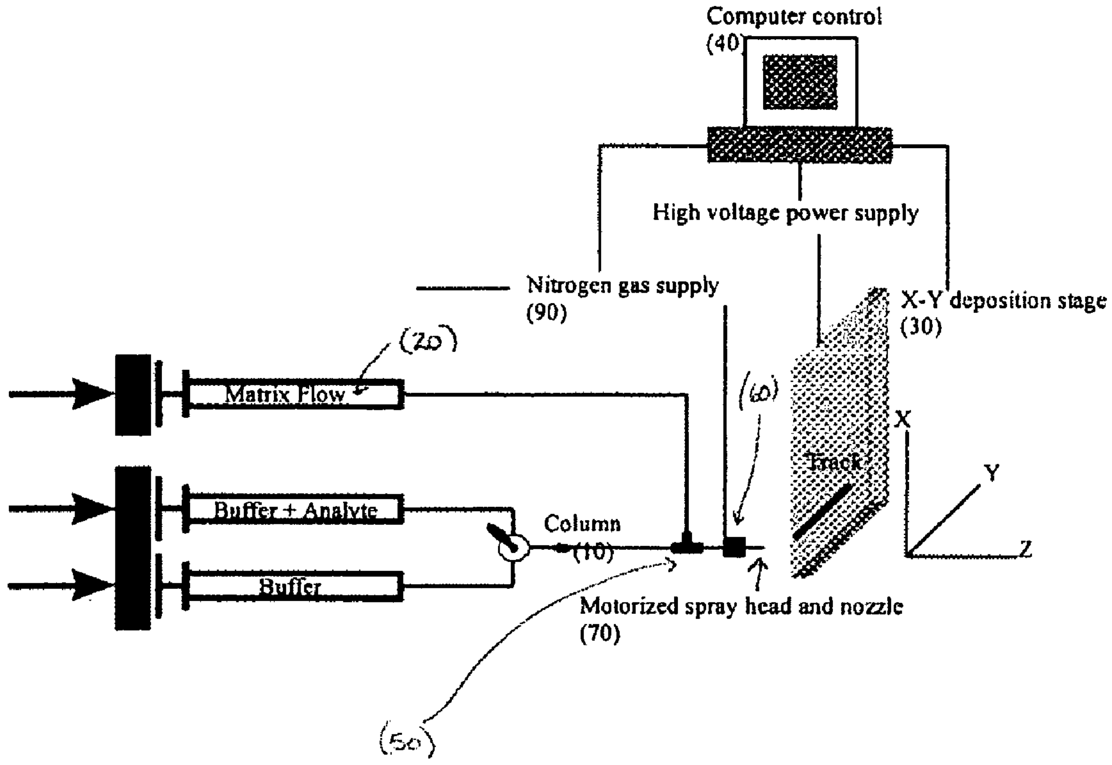
FIG. 1 is a schematic of a system illustrating one embodiment of the present invention that is used for FAC-MALDI/MS/MS: The column outlet is connected to a mixing tee for addition of MALDI matrix solution that flows directly into nebulizer to allow spraying of the mixture onto a MALDI plate that is moved under the column outlet on a computer controlled X-Y translation stage.

The interfacing of bioaffinity columns to MALDI/MS as a new platform for FAC/MS studies is described herein. Capillary columns containing entrapped. dihydrofolate reductase (DHFR) were used for frontal affinity chromatography of small molecule mixtures. The output from the column combined with a second stream containing the matrix molecule α-cyano-hydroxycinnamic acid (CHCA) in methanol and was deposited using a nebulizer-assisted electrospray method onto a conventional MALDI plate that moved relative to the column via a computer controlled x-y stage, creating a semi-permanent record of the FAC run. The use of MALDI MS/MS allowed for a decoupling of the FAC and MS methods allowing significantly higher ionic strength buffers to be used for FAC studies, which reduced non-specific binding of ionic compounds and allowed for better retention of protein activity over multiple runs. Following deposition, MALDI analysis required only a fraction of the chromatographic runtime, and the deposited track could be re-run multiple times to optimize ionization parameters and allow signal averaging to improve signal to noise. Furthermore, high levels of potential inhibitors could be detected via MALDI with limited ion suppression effects. Both MALDI and ESI based analysis showed similar retention of inhibitors present in compound mixtures when identical ionic strength conditions were used. The results show that FAC/MALDI-MS will provide advantages over FAC/ESI-MS for high-throughput screening of compound mixtures.

The present invention therefore includes a system for analyzing chemical samples comprising a frontal affinity chromatographic (FAC) column interfaced to a MALDI mass spectrometer.

The term "analyzing" as used herein means that information about one or more compounds in a chemical sample is obtained using the system. Such information can include, but is not limited to, compound identity (via molecular weight and fragmentation patterns), and affinity, reactivity and other kinetic constants related to the interaction of the compound with biological material in the column (i.e. the retention time on the column).

By "interfaced" it is meant that the effluent stream from the FAC column is combined with a MALDI matrix material, for example from a separate stream, and the combination is deposited on any suitable surface, for example a standard MALDI-MS plate, for MALDI-MS detection. The combination may be deposited as discrete spots or as a continuous track using any suitable method, for example, but not limited to, fraction collection followed by MALDI deposition;[11] nebulizer assisted direct deposition of spots[12,13,14] or tracks[15,16] from the capillary; electrodynamic charged droplet processing;[17] deposition using a heated droplet interface;[18] piezoelectric flow-through microdispensing;[19,20] vacuum assisted deposition;[21] electric field driven droplet deposition;[22] electrospray deposition;[23] or capillary nebulizer spraying.[24,25] In an embodiment of the invention, deposition is by nebulizer assisted direct deposition of tracks.

In an embodiment of the invention, the movement of the plate during deposition is controlled by a computer.

An exemplary embodiment of a system of the present invention is shown in FIG. 1. For deposition onto a MALDI plate, effluent from column (10) may be mixed with a MALDI matrix (20). The resulting total flow may then deposited onto MALDI plate(s) (30) using any known deposition method, for example, by continuous deposition. Movement of the plate(s) in the X-Y-Z translational stages may be controlled by computer (40). The translational stages control the deposition motion in X-Y plane and sprayer separation from the MALDI plate along the Z axis. Along with the movement in all three axes, the application of high voltage and nebulizer gas flow may also be controlled from a single computer (40). The column flow may be combined with matrix make up flow via Tee junction (50). The combined flow is carried, for example by fused silica tubing, passing through a stainless steel electrode (60) which itself is inside a nebulizer. Both the fused silica and stainless steel electrode protrude slightly from the nozzle (70). Another mixing Tee (80) is used to mount the nebulizer and introduce the inert gas (90) (for example $N_2$) into it. Both the electrospray voltage and nebulizer gas flow may be manually adjusted and digitally actuated.

Using methods known in the art, deposition parameters, including distance of the sprayer above the plate, nebulizer gas flow, and electric field, may be optimized to obtain maximum track homogeneity and minimum track width. The translation speed with which the plate is moved under the deposition tip may also be optimized to provide optimum track thickness while maintaining the necessary chromatographic resolution.

Figure 2:
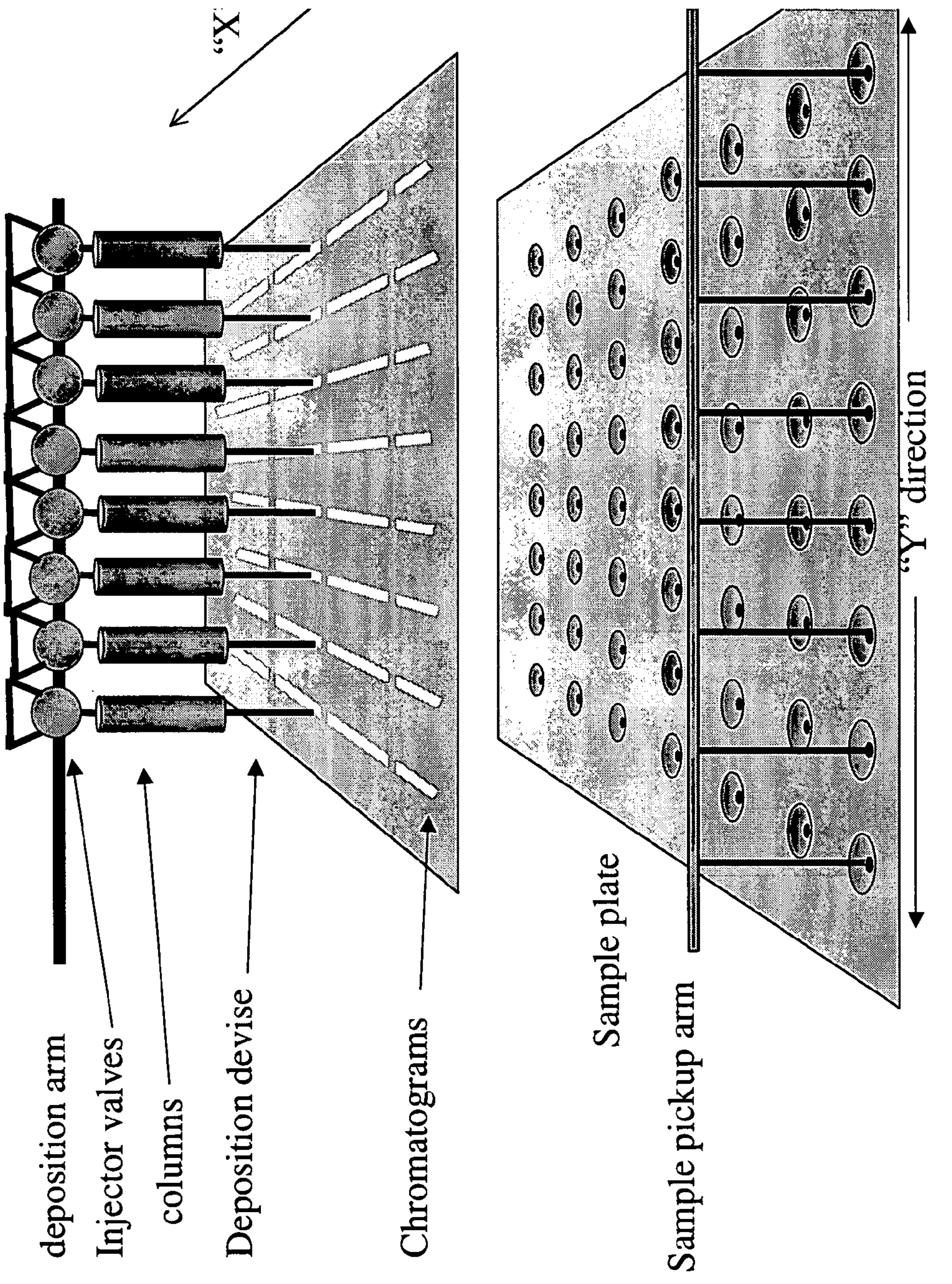
FIG. 2 is a schematic showing an exemplary embodiment of the interfacing of multiple FAC columns with a MALDI-MS plate.

The system of the present invention may be applied to the analysis of chemical samples using multiple FAC columns run in tandem. A schematic showing an exemplary embodiment of an interface between multiple FAC columns and an MS plate is shown in FIG. 2.

Deposited plates may be analysed using any mass spectrometer equipped with a MALDI ion source using techniques known in the art.

The FAC column may be any type of column used as a solid support in any application for which FAC is used. In an embodiment of the invention the FAC column is a bioaffinity capillary column. In a further embodiment of the invention the FAC column comprises a monolithic silica matrix. Suitably, the monolithic silica matrix is prepared using sol-gel techniques. In embodiments of the invention the monolithic silica matrix is prepared using biomolecule compatible techniques. By "biomolecule compatible" it is meant that the techniques are stabilizing to proteins and/or other biomolecules or do not facilitate their denaturation. Methods for preparing biomolecule compatible silica matrixes suitable for FAC are reported in Zhang et al. U.S. Patent Application Publication No. US-2004-0249082-A1, published on Dec. 9, 2004.

The chemical sample may be a solution containing any number of chemical entities. In an embodiment the method is used in a high through-put screen for modulators, substrates, and/or other compounds that bind to a biological molecule, for example a protein, peptide or nucleic acid (including DNA and RNA) or to biological materials, for example cells and tissues, wherein said biological molecule or material is entrapped within the matrixes of the column or otherwise immobilized onto the column. The sample may contain for example, a library of compounds or an extract from a natural source. The method may also be used to screen for putative enzymatic modulators while monitoring all chemical entities including the substrates and products of enzymatic reactions, for example in high throughput enzymatic reaction characterization, or other biomolecular reactions.

The terms "biomolecule" or "biological material" as used herein, are interchangeable and means any of a wide variety of both naturally occurring and synthetic proteins, enzymes and other sensitive biopolymers including DNA and RNA and derivatives thereof, as well as complex systems including whole plant, animal and microbial cells that may be entrapped in silica. The biomolecule may be dissolved in a suitable solvent, for example an aqueous buffer solution. In an embodiment of the invention, the biological substance is in its active form.

The present invention also includes a method of analyzing chemical samples from frontal affinity chromatography (FAC) comprising:

(a) combining effluent from a FAC column with a matrix;

(b) depositing the combination in (a) on to a surface; and (c) analyzing the deposited combination using MALDI mass spectrometry.

The matrix may be any material used in MALDI-MS. In an embodiment of the invention, the matrix is α-cyano-hydroxycinnamic acid (CHCA) dissolved in methanol. Suitably the concentration of the CHCA solution may be about 0.01 M to about 0.1 M, more suitably about 0.03 to about 0.05 M.

The effluent and matrix are suitably combined in about a 1:2 to about 2:1 volume ratio. In an embodiment the effluent and matrix are combined in about a 1:1 volume ratio.

The effluent from the FAC column will comprise the eluent and optionally, one or more compounds from the sample. Any eluent suitable for FAC and the particular column being used may be employed. It is a particular advantage of the present invention that the eluent may comprise high ionic strength elution buffers, for example buffers with an ionic strength greater than 10 nM.

A person skilled in the art would be able to determine appropriate flow rates, eluents and other chromatographic parameters based on, for example, the column size, column material and sample identity, using methods known in the art.

The following non-limiting examples are illustrative of the present invention:

EXAMPLES

Chemicals: Tetraethylorthosilicate (TEOS, 99.999%) and 3-aminopropyltriethoxysilane (APTES) were obtained from Aldrich (Oakville, ON). Diglycerylsilane precursors were prepared from TEOS as described elsewhere.[26] Trimethoprim, pyrimethamine, folic acid, poly(ethyleneglycol) (PEG/PEO, MW 10 kDa) and fluorescein were obtained from Sigma (Oakville, ON). MALDI matrix solution (6.2 mg/mL α-cyano-hydoxycinnamic acid, CHCA, in methanol) was obtained from Agilent (part no. G2037A). Recombinant dihydrofolate reductase (from *E. coli*), which was affinity purified on a methotrexate column, was provided by Professor Eric Brown (McMaster University).[27] Fused silica capillary tubing (250 μm i.d., 360 μm o.d., polyimide coated) was obtained from Polymicro Technologies (Phoenix, Ariz.). All water was distilled and deionized using a Milli-Q synthesis A10 water purification system. All other reagents were of analytical grade and were used as received.

Instrumentation

Figure 3:
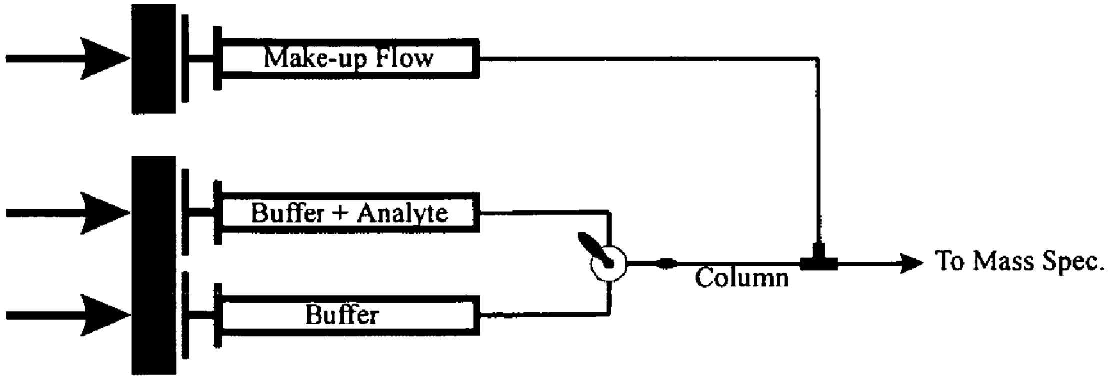
FIG. 3 is a schematic of a prior art system used for FAC-ESI/MS/MS. A switch valve is used to switch from buffer to buffer+analyte, allowing continuous infusion of analytes onto the column. The column outlet is connected to a mixing tee for addition of makeup buffer that flows directly into the PE/Sciex API 3000 triple-quadrupole mass spectrometer.

FAC/MS System: The system used for FAC/ESI-MS studies is shown in FIG. 3. Syringe pumps (Harvard Instruments Model 22) were used to deliver solutions, and a flow-switching valve was used to toggle between the assay buffer and the solution containing the compound mixture. This solution was then pumped through the column to achieve equilibrium. Effluent was combined with a suitable organic modifier to assist in the generation of a stable electrospray and detectability of the sprayed components using a triple-quadrupole MS system (PE/Sciex API 3000™). A Rheodyne 8125 injector valve was used to switch from buffer to buffer+analyte streams during operation. Columns were interfaced to the FAC system using Luer-capillary adapters (Luer Adapter, Ferrule and Green Microtight Sleeve from Upchurch (P-659, M-100, F-185X)). All other connections between components were achieved using fused silica tubing.

Instrumentation for FAC/MALDI/MS/MS is shown in FIG. 1. For deposition onto the MALDI plate, column effluent was mixed in a 1:1 volume ratio with α-cyano-hydoxycinnamic acid (CHCA) MALDI matrix in methanol flowing at 5 μL/min. The resulting total flow was then deposited onto MALDI plate(s) using a continuous deposition process. In the present experiment, a custom-built nebulizer assisted electrospray system was used to deposit a track onto an Applied Biosystems MALDI sample plate (Opti-TOF™ system) mounted on a computer controlled X-Y translation stage. The translation stage is a part of a three-axis positioning system consisting of a 404 series axis, Aries controllers and ACR PCI control card from Parker Hanifin and Compumotors, respectively, that controls the deposition motion in X-Y plane and sprayer separation from the MALDI plate along the Z axis. All three axes as well as application of high voltage (custom built digitally controlled high voltage power supply, 4 kV) and nebulizer gas flow (Clippard minimatics valve ET-2M) were controlled from a single Dell Precision 340 computer through the ACR control card. The column flow was combined with CHCA make up flow in a stainless steel Tee junction from Valco. The combined flow was carried by fused silica tubing (200 μm/100 μm o.d./i.d.) passing through a stainless steel electrode which itself was inside a nebulizer. Both the fused silica and stainless steel electrode protrude slightly (1 mm) from the nozzle (0.6 mm i.d.). A mixing Tee was used to mount the nebulizer and introduce the $N_2$ gas into it. Both the electrospray voltage and nebulizer gas flow were manually adjusted and digitally actuated.

Deposition parameters, including distance of the sprayer above the plate, nebulizer gas flow, and electric field, were optimized to obtain maximum track homogeneity and minimum track width. The translation speed with which the plate was moved under the deposition tip was also optimized to provide optimum track thickness while maintaining the necessary chromatographic resolution. The optimal height of the electrospray tip was 8 mm above the sample plate, while a combination of gas flow (Nitrogen at 1.5 L/min) and electric field (3 kV between the electrospray tip and MALDI plate) was used to deposit the traces. For this work the MALDI plate was moved at 0.2 mm/sec relative to the stationary deposition tip.

Figure 4:
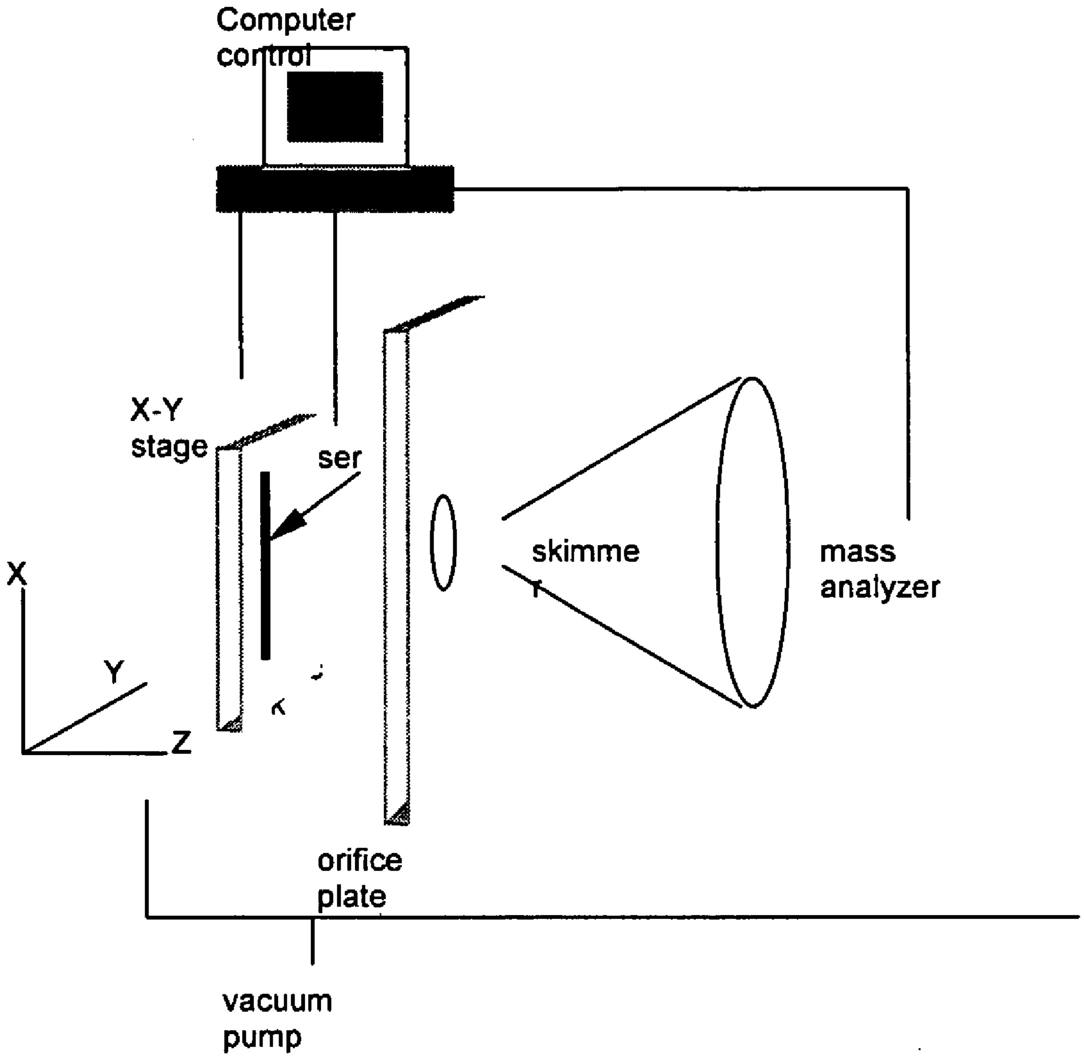
FIG. 4 is a schematic showing the vacuum based oMALDI™ ion source assembly of the API 4000, which places the MALDI sample plate within the region evacuated by the interface vacuum pump in an orientation orthogonal to the analyzer axis.

The deposited plates were analyzed using an AB/Sciex API 4000™ triple quadrupole mass spectrometer equipped with an AB/Sciex oMALDI™ ion source and high repetition rate (1.4 kHz) PowerChip NanoLaser (355 nm) from JDS Uniphase. The vacuum based oMALDI™ ion source replaced the normal orifice/interface assembly of the API 4000™ and its Turbo V™ source, thus placing the MALDI sample plate within the region evacuated by the interface vacuum pump in an orientation orthogonal to the analyzer axis, as shown in FIG. 4. Normal source parameters were used to set-up and control the oMALDI™ ion source. Within the source the MALDI plate was held on an X-Y translation stage in front of an orifice and skimmer that separate it from the analyzer. The modified API 4000™ retained its full capability of scan modes and scan speeds. During MALDI analysis, the deposited track (plate) was moved relative to the desorbing laser beam at a constant speed of 3.8 mm/sec by the MALDI source X-Y stage, unless otherwise stated. The desorbing laser beam was focused to a 180×230 μm spot on the track surface.

Procedures

Preparation of Columns: Macroporous silica columns containing entrapped DHFR were prepared as described in detail elsewhere.[9] Briefly, 250 μm i.d. capillaries were first coated with a layer of APTES to promote electrostatic binding of the monolithic silica column. Silica sols were prepared by first mixing 1 g of DGS (finely ground solid) with 990 μL of $H_2O$ to yield ~1.5 mL of hydrolyzed DGS, after 15-25 min of sonication. A second aqueous solution of 50 mM HEPES at pH 7.5 was prepared containing 16% (w/v) PEO (MW=10 kDa) and 0.6% (v/v) APTES. This aqueous solution also contained ca. 20 μM of DHFR. 100 μL of the Buffer/PEG/APTES/DHFR solution was mixed with 100 μL of hydrolyzed DGS and the mixture was immediately loaded via syringe pump into a fused silica capillary (ca. 2 m long). The final composition of the solution was 8% w/v PEO (10 kDa), 0.3% v/v APTES and 10 μM DHFR in 25 mM HEPES buffer. The mixture became cloudy due to spinodal decomposition (phase separation) over a period of 1-3 sec about 2-3 min prior to silica polymerization (~10 min) to generate a hydrated macroporous monolithic column containing entrapped protein. After loading of the sol-gel mixture, the monolithic columns were aged for 2-5 days at 4° C. and then cut into 5 cm lengths before use. The columns had an initial loading of 25 pmol of active DHFR in 5 cm, of which ~6 pmol was active and accessible in the column.[9]

FAC/MS Studies: Typical FAC/MS experiments involved infusion of mixtures of compounds containing 50 nM of each compound, including N-acetylglucosamine and/or fluorescein as void markers, folic acid (micromolar substrate) and pyrimethamine and trimethoprim (nM inhibitors). Before the first run, the column was flushed with 50 mM $NH_4OAc$ buffer (pH 6.6, 100 mM NaCl) for 30 min at a flow rate of 5 $\mu L.min^{-1}$ to remove any glycerol and non-entrapped protein and then equilibrated with 0-100 mM $NH_4OAc$ for 30 min at 5 $\mu L.min^{-1}$. All compounds tested were present in 0-100 mM $NH_4OAc$ and were delivered at a rate of 5 $\mu L.min^{-1}$ using the syringe pump. The makeup flow (used to assist in the generation of stable electrospray ionization) consisted of methanol containing 10% (v/v) $NH_4OAc$ buffer (2 mM) and was delivered at 5 $\mu L.min^{-1}$, resulting in a total flowrate of 10 $\mu L.min^{-1}$ entering the ESI mass spectrometer. For MALDI, the makeup flow was replaced with a flow of matrix (CHCA 6.2 mg/mL in methanol) at 5 uL.min$^{-1}$. The ESI mass spectrometer was operated in MRM mode with simultaneous detection of m/z 222→m/z 204 (N-acetylglucosamine CE 15 eV); m/z 249→m/z 233 (pyrimethamine CE 42 eV); m/z 291→m/z 230 (trimethoprim CE 35 eV); m/z 333→m/z 202 (fluorescein CE 15 eV) and m/z 442→m/z 295 (folic acid). MALDI MS/MS analysis was also performed using MRM scan mode but due to fragmentation during the MALDI desorption process the transitions for N-acetylglucosamine and folic acid were changed to m/z 204→m/z 138 (CE 18 eV) and m/z 295→m/z 176 (CE 30 eV), respectively.

The much shorter analysis times achievable with MALDI makes necessary a reduction in signal accumulation bin duration (dwell time) in order to maintain sufficient sampling frequency. The ESI based MRM analysis used 1000 ms dwell while the MALDI MRM dwell was reduced to 40 ms per transition. Hence when comparing steady-state MRM signal variation between the two ionization methods, the higher noise levels of the MALDI signal are due to an increase in normal statistical variation of the accumulated counts, a side effect of the reduced dwell, and due to variation in homogeneity of the track (ESI samples a small fraction of the spray that is stable in time while the plate captures all analyte including any temporal variations and variations in drying/crystallization).

DHFR Stability in Ammonium Acetate: DHFR was diluted to 40 nM in 2 mM or 100 mM ammonium acetate, (which contained 3 μM HEPES and 2 μM NaCl) and was incubated for various periods of time up to 24 hours. At specified intervals, 100 μL aliquots were mixed with 100 μL of a solution containing 50 mM Tris.HCl pH=7.5, 2 mM DTT, 100 μM NADPH and 100 μM DHF. DHFR activity was measured by monitoring the decrease in absorbance at 340 nm using a Tecan Safire microplate reader. Activity data is reported relative to the activity obtained from a DHFR sample that was diluted in 50 mM Tris.HCl, pH 7.5, containing 2 mM DTT.

Results

Example 1

FAC/ESI-MS/MS

Figure 5:
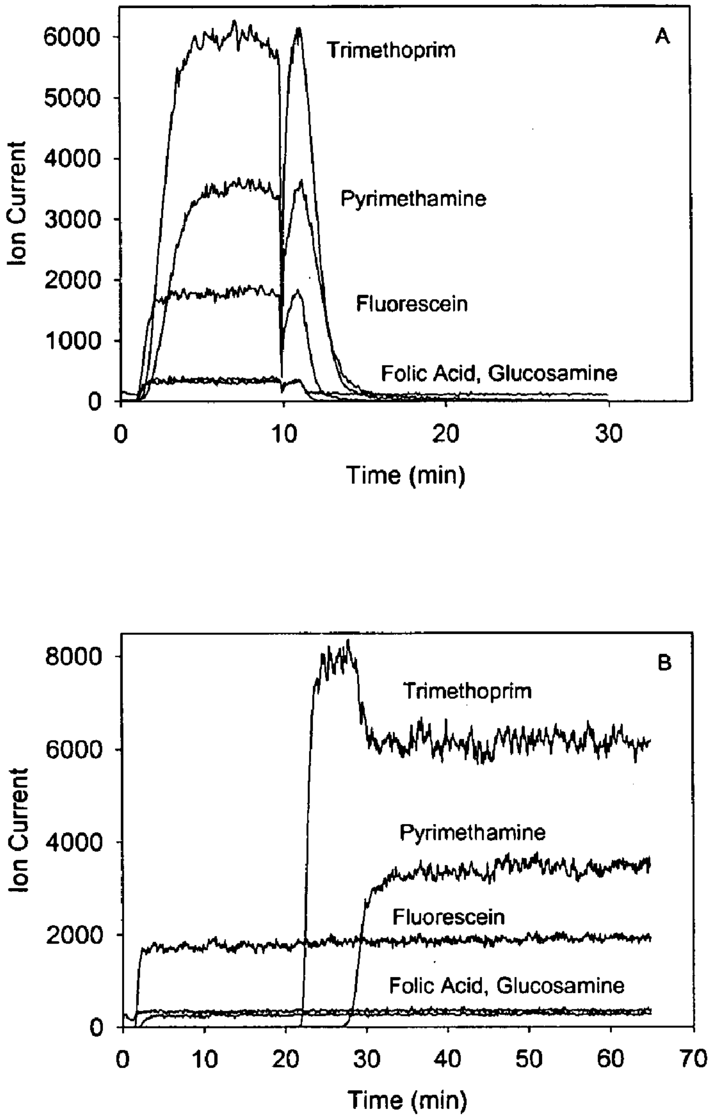
FIG. 5 shows typical FAC-ESI/MS/MS traces obtained using protein-loaded and blank DGS/PEO/APTES monolithic columns. Panel A: blank column containing no protein; Panel B: column containing 25 pmol DHFR (initial loading). N-acetylglucosamine, fluorescein, folic acid, pyrimethamine and trimethoprim were infused at 50 nM. Traces show actual ion currents to provide a clearer indication of the ion suppression effect.

FIG. 5 shows FAC/ESI-MS/MS traces obtained for elution of mixtures of DHFR inhibitors and control compounds through DGS/PEO/APTES columns containing no protein (Panel A) or an initial loading of 25 pmol of active DHFR (Panel B). The blank column shows the expected breakthrough of all compounds in the first few minutes (between 1 and 4 min), although both pyrimethamine and trimethoprim, which are cationic, are retained slightly longer than the anionic compounds fluorescein and folic acid. The retention, which is present when using 2 mM ammonium acetate buffer, is indicative of non-selective interactions between the cationic compounds and the anionic silica column, showing that normal-phase silica chromatography is not fully suppressed at low ionic strength. Panel B shows significant retention of the two DHFR inhibitors, trimethoprim ($K_d$=4 nM, elution time of 22 min) and pyrimethamine ($K_d$=45 nM, retention time 28.5 min), less retention of a weak substrate (folic acid, $K_d$=11 μM, retention time=3 min) and no retention of non-selective ligands (fluorescein, N-acetyl-gluconamide, retention time=1.5 min) on DHFR loaded columns. This result indicates that DHFR is active when entrapped in the column, in agreement with recent results showing good activity of DHFR when entrapped in DGS derived materials.[9,28] An interesting aspect of the ESI/MS/MS derived chromatogram is the large reduction in ion current for trimethoprim upon elution of pyrimethamine. Such effects have previously been associated with a "roll-up" phenomenon, wherein stronger binding compounds bump off weaker binders, causing a transient overconcentration of the weaker binding ligand.[5] However, in the present case, the loss in ion current is not due to a roll-up effect, but rather is due to suppression of the trimethoprim ion current, which is prevalent at the concentration of inhibitor used in this study (50 nM). Previous FAC-ESI/MS/MS studies using these compounds at lower levels (20 nM) did not show such an effect.[9] The ion suppression effect is further confirmed by FAC-MALDI/MS/MS data that is presented below.

The reversal in the expected elution times for trimethoprim and pyrimethamine (based on their respective $K_d$ values) has been reported previsously,[9] but is not fully understood at this time. It is suspected that this phenomenon may be related to differences in on and off rates, which are likely to play a significant role in determining the overall retention time of compounds on the column.

Example 2

Figure 6:
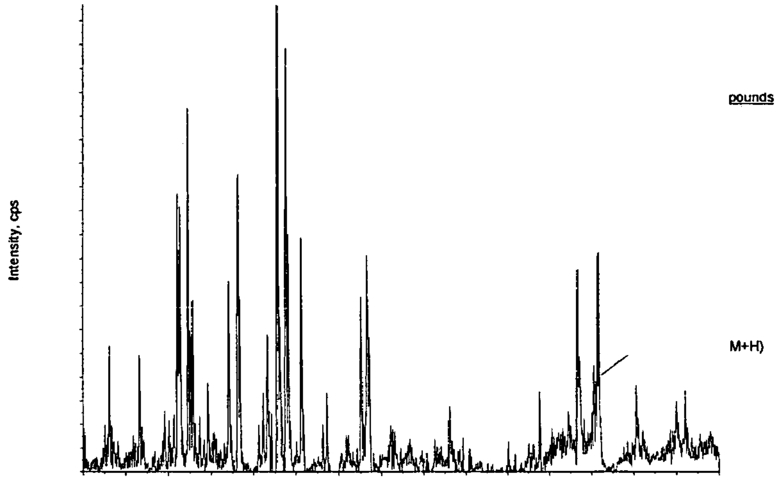
FIG. 6 shows multi pass selection of MRM transition for folic acid using MALDI/MS. Panel A shows a Q1 full scan of a mixture of folic acid, fluorescein, pyrimethamine and trimethoprim (50 nM each) mixed 1:1 (v:v) with 6.2 mg/mL CHCA in MeOH and deposited on a MALDI plate. The Q1 spectrum has had background signals originating from the matrix removed by subtraction. Panel B shows the Q3 product ion scan originating from the m/z 442 parent ion. Panel C shows the Q3 product ion scan originating from the m/z 295 parent ion. All scans were obtained using medium laser translation speed (1 mm/sec) and are the average of 5 re-runs over a given sample region.
Figure 6:
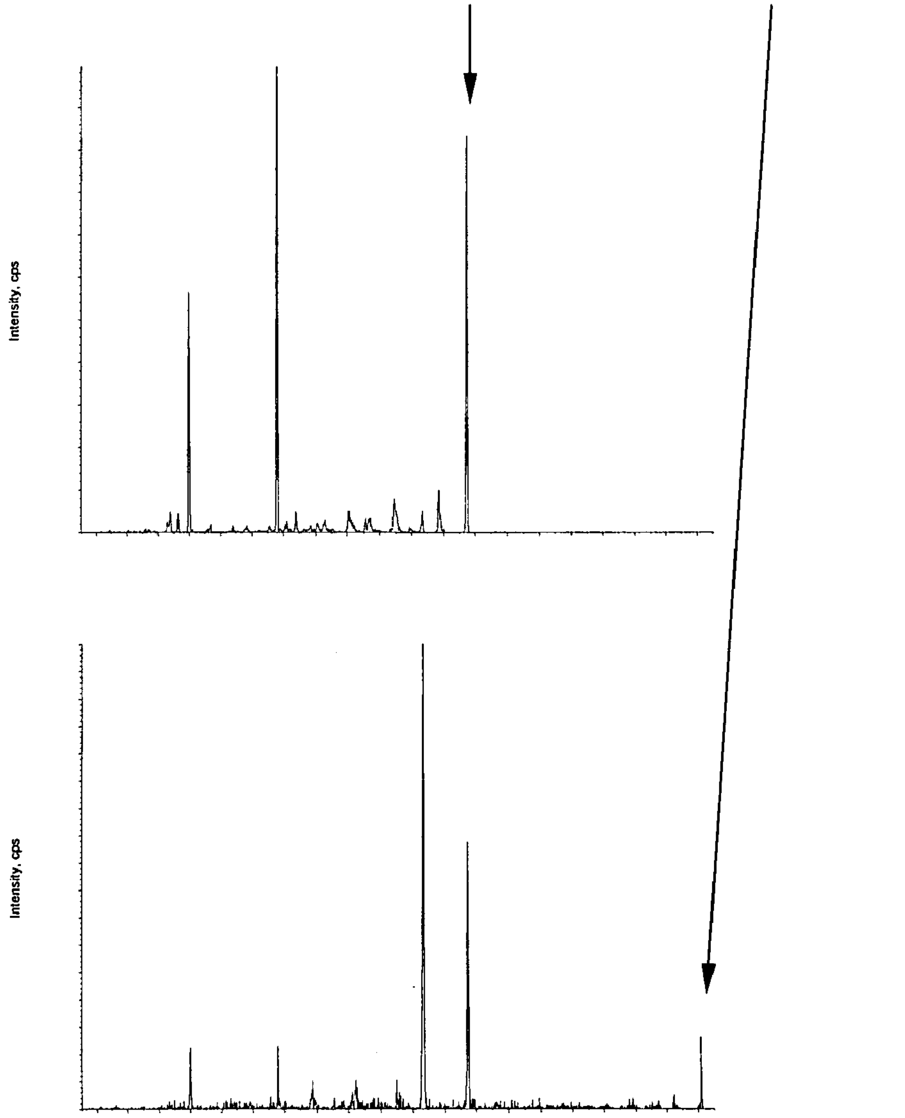

FAC-MALDI/MS/MS (a) Optimization of MALDI MRM Transitions: A useful feature of off-line MS analysis by MALDI is the ability to rerun sample tracks multiple times to allow different MS data to be acquired, which allows for optimization of MRM parameters. FIG. 6 shows a MALDI Q1 spectrum of a mixture of the four target analytes (folic acid, pyrimethamine, trimethoprim and fluorescein) after appropriate background subtraction to reduce CHCA background signals. Peaks are evident for each of the four compounds; however, the primary peak for folic acid occurs at m/z 295 rather than at m/z 442, indicative of a fragment ion being the primary species present for this compound. Focusing on folic acid, product ion scans obtained from the same track using the m/z 295 parent ion clearly show a maximum peak at m/z 176, with an intensity of $5.5\times10^5$ cps. The most abundant product ion obtained from the m/z 442 parent ion was only 15% as intense as the m/z 295→m/z 176 ion pair. This is in contrast to the case for ESI, where the m/z 442→m/z 295 transition showed maximum intensity, and highlights the importance of being able to optimize MRM transitions directly on the MALDI plate.

(b) Optimization of MALDI Parameters: Analysis of the deposited tracks on the MALDI plate show that the typical track width obtained using the present deposition parameters was ca. 2.5 mm. The spot size of the laser was 180×230 μm, which generally lead to the burn track being ~10% the width of the deposited track. The utilization of only a small amount of the deposited sample during MALDI acquisition offers an advantage in method set-up, where MRM selection and analyzer optimization can be achieved with a fraction of the sample (~10 pg) as compared to ESI (~100 pg), through track/spot re-running.

Figure 7:
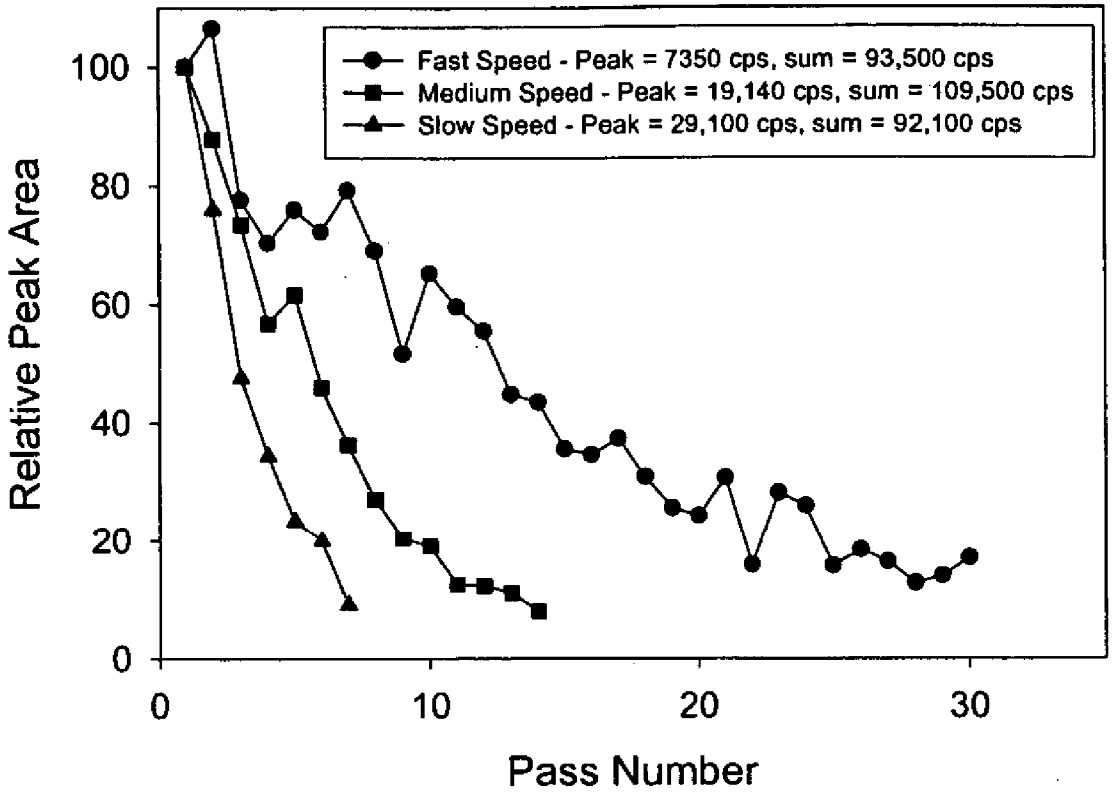
FIG. 7 shows MALDI/MS signal intensity as a function of number of reruns of a given region for slow (0.5 mm/s, ▲), medium (1 mm/s, ■) and fast (3.8 mm/s, ●) translation speeds. The peak value refers to the number of counts obtained for the first pass over the track, the sum value refers to the total number of counts obtained from all runs over a given track at a particular speed.

A question that arises is the number of times that a particular region of a track can be re-run, as this determines how to best utilize the ability to re-run an already sampled portion of the track and hence increase the efficiency of the detection process. The number of times a track can be re-run depends on the laser fluence and the speed with which the laser is translated over the sample. The laser fluence used for the MALDI process was set to 3 μJ/pulse. This value optimized the signal-to-noise ratio while minimizing thermal degradation of the track surface, thus allowing maximum sample utilization. The effect of sampling speed on the number of possible re-runs over the same region of the track is shown in FIG. 7. It is clear that sample consumption depends on the speed with which laser traverses the track, with greater speed causing less sample consumption and allowing more re-runs. The maximum speed of the MALDI source stage (3.8 mm/sec) allows about 30 re-runs prior to sample exhaustion occurring in a given region of the track, where the majority of the signal is desorbed during the first 15 passes. However, since only a small portion (~10%) of the total track is sampled, it is likely that up to 7-8 different regions could be sampled per track, and thus in practice a single deposited track could be sampled over 100 times. Varying the laser translation speed through the values allowed by the source (0.5 mm/sec, 1 mm/sec and 3.8 mm/sec) shows that there is a significant increase in the maximum signal intensity at slower speeds, but a decrease in the number of re-runs that can be done. Thus, the total signal obtained by complete exhaustion of a given sample region remained relatively constant and independent of the speed with which the data were generated. Using the high translation speed offers the fastest acquisition of an interpretable signal, hence maximizing the throughput.

The analyte:matrix ratio was also varied in the range of 3:1 to 1:3 (v:v) to achieve optimum detection for the four compounds. The results, expressed as signal over background per unit of analyte, are summarized in Table 1. It is clear that the optimum ratio is compound specific. However, use of the 1:1 (v:v) ratio offers the best compromise between overall sensitivity and ability to detect all compounds. Indeed, detection of fluorescein was possible only at a 1:1 analyte:matrix ratio, as the matrix background for the m/z 333→m/z 202 transition was extremely high, and overwhelmed the fluorescein signal at other analyte:matrix ratios. It has also been observed that MALDI performance at higher buffer concentration improves with slightly higher CHCA content, which may improve both crystallization and competition for charge.

Figure 8:
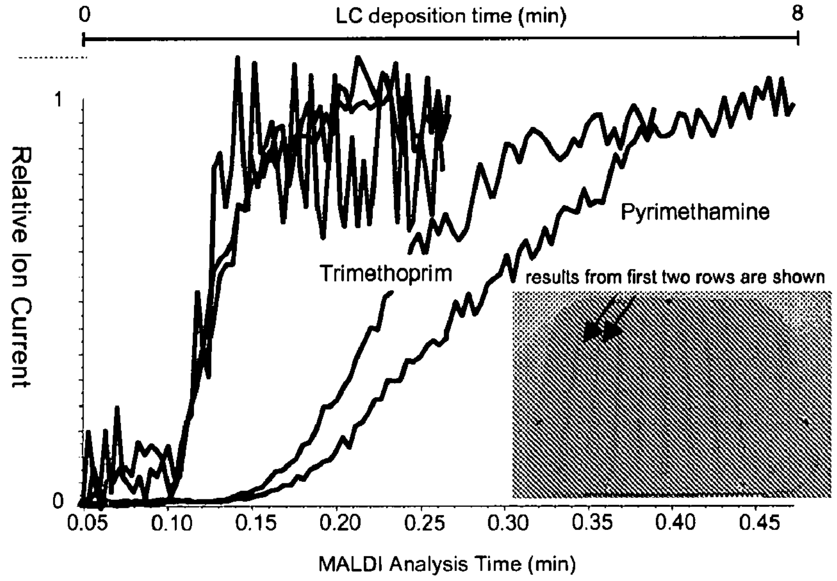
FIG. 8 shows FAC-MALDI/MS/MS traces obtained using protein-loaded and blank DGS/PEO/APTES monolithic columns. Panel A: blank column containing no protein; Panel B: column containing 25 pmol DHFR (initial loading) showing breakthrough of N-acetylglucosamine, fluorescein and folic acid at early times, trimethoprim and finally pyrimethamine. All compounds were infused at 50 nM. All traces are normalized to the maximum signal obtained after compound breakthrough. Note that MALDI analysis time is 19 fold faster than LC deposition time. All FAC traces were obtained using a fast laser translation speed (3.8 mm/sec) and are the average of 5 re-runs over a given sample region.
Figure 8:
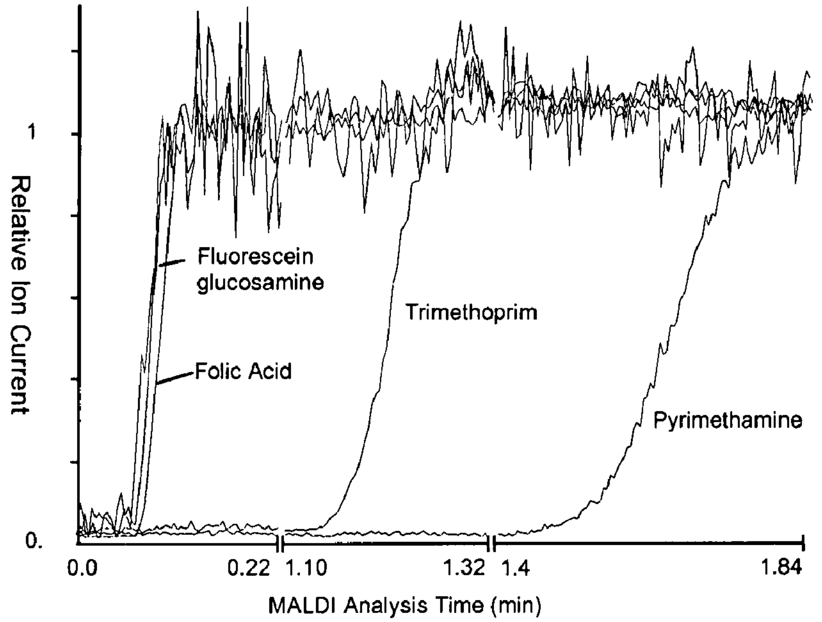

(c) FAC-MALDI/MS/MS Analysis: FIG. 8 shows the FAC traces obtained upon desorption from MALDI plates onto which the eluent from either blank (FIG. 8*a*) or DHFR columns (FIG. 8*b*) had been deposited using 2 mM ammonium acetate as the running buffer. In FIG. 8*a*, the compounds elute in the first two traces that are deposited onto the MALDI plate (arrows show the traces that have been analyzed). The bottom scale of FIG. 8 shows MALDI analysis time, which can be converted into LC elution time using ratio of deposition speed to laser read out speed as a multiplication factor, which is 19 in this case. As was the case for FAC-ESI/MS/MS, the fluorescein, N-acetylglucosamine and folic acid elute first (1.5 min LC time) followed by trimethoprim (3 min LC time) and pyrimethamine (3.5 min LC time), again showing non-specific binding of the analytes when using low ionic strength buffers. This is not surprising, as the elution time is dictated by the column rather than the specific type of MS employed for detection. More interestingly, the MS analysis time required for the analysis of the traces on the plate is less than 0.5 min, compared with 8 min of actual LC time. Thus, although the LC deposition time is similar for both methods, it is possible to use multiple modes of MS to interrogate the same sample (see FIG. 7) with each mode requiring only a few minutes to run.

FIG. 8*b* shows the data obtained from the DHFR loaded column. Once again, the two nM inhibitors show significant retention, with retention times that are similar to those obtained from FAC-ESI/MS/MS (trimethoprim; $t-t_0=20$ min, pyrimethamine; $t-t_0=28.5$ min). The slightly longer elution times relative to ESI/MS reflect the fact that the column used for the FAC/MALDI study was slightly longer than the one used for FAC/ESI. An important finding from the FAC/MALDI analysis is the low ion suppression, which shows another important advantage of the MALDI MS/MS method. This may be due to MALDI ionization being closer in nature to chemical ionization (and APCI) than ESI. In case of MALDI, laser desorbed species are ionized by interaction with CHCA ions within the plume generated from the surface. In such a case the results are consistent with the well established observation of reduced ion suppression in the APCI process.[10,29,30] MALDI signal suppression due to high levels of impurities has been reported by Krause[31] and Gharahdi[32] but this may be caused more by changes in the crystallization of the sample, where wet spot crystallization under such conditions produces inhomogeneous rimmed spots, or by insufficient CHCA is present in the sample. In such a case a surface opaque to the laser beam is formed upon drying. In the present deposition method, both the crystallization process and CHCA amount were optimized to produce high density tracks of small crystallites (near-dry spray impinges on the MALDI plate) with a high surface to volume ratio, a parameter important to surface-driven processes such as MALDI.

Table 2 compares the signal-to-background levels obtained from ESI and MALDI MS/MS methods using 2 mM and 100 mM ammonium acetate (AA) buffer levels for MALDI and 2 mM for ESI, and provides a means for conversion of the normalized plots to absolute counts. It should be noted that even though the ESI and MALDI experiments were each made using a different mass analyzer, API 3000™ and API 4000™ respectively, a general comparison (intended as a guide only) is possible since by converting the API 4000™ for MALDI operation by fitting an oMALDI™ source its normal orifice/interface and Turbo V™ source have been removed. It is these components that provide the significant performance enhancement over the API 3000™ at flow rates above 50 μL/min. The data shows that while MALDI offers approximately the same level of signal with a 100 mM buffer as ESI does with 2 mM buffer, MALDI offers a significant increase in sensitivity with 2 mM AA buffer. This result is further corroborated by comparing total signal generated by the two techniques for a fixed amount of sample, as shown in Table 3. MALDI analysis of a 50 nM solution of each analyte in 2 mM AA buffer generates approximately 20-100× the total signal obtained from ESI. For the ESI process, only a very small portion of sprayed sample actually enters the analyzer and gets detected, where MALDI tracks capture all of the sample and allow repeated analysis of the track and captured sample.

While signal levels in MALDI are higher than those in ESI, MALDI acquisition suffers from more noise owing to a shorter dwell time of 40 ms vs. 1000 ms for ESI, and added noise due to inhomogeneity in the track. Even so, the MALDI process offers the ability to reduce its noise by combining signal from numerous re-runs of a track. The resulting noise reduction through signal averaging can be applied until a desired level required for data interpretation is reached. The fast laser re-running of the track and selective application of the summing allows an efficient use of a fixed amount of sample in a time sensitive manner.

Figure 9:
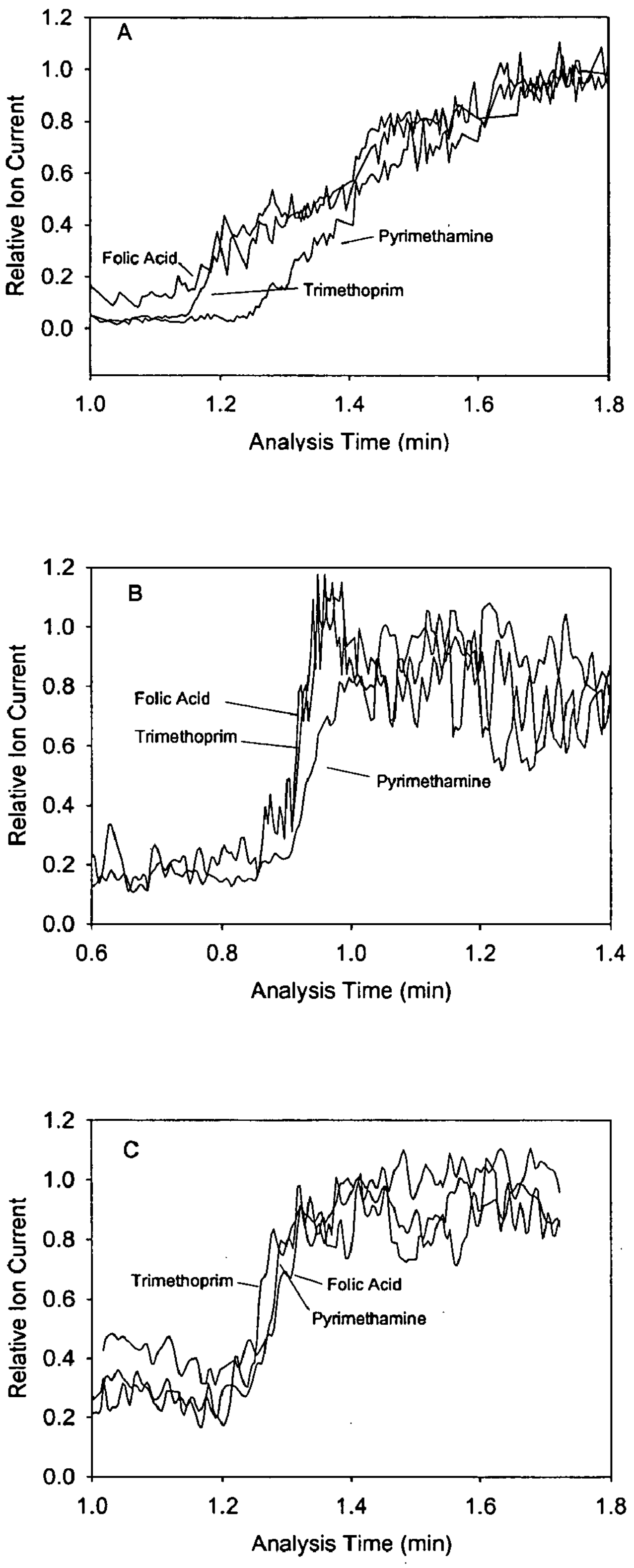
FIG. 9 shows the effect of ionic strength on non-specific binding of compounds to blank monolithic columns analyzed by FAC/MALDI. MALDI MRM traces are shown for the first run of folic acid, trimethoprim and pyrimethamine (50 nM each) using a) 2 mM ammonium acetate buffer, b) 50 mM buffer and c) 100 mM buffer. All data was run on the same column with pre-incubation of the column in the appropriate buffer prior to introduction of compounds. All FAC traces were obtained using a fast laser translation speed (3.8 mm/sec) and are the average of 5 re-runs over a given sample region.

Given that MALDI analysis was possible even with 100 mM AA buffer, the effect of ionic strength on the FAC process was investigated. FIG. 9 shows the effects of ionic strength on the degree of non-specific binding, using blank monolithic columns. In this case, only folic acid, pyrimethamine and trimethoprim are eluted, with folic acid acting as a void marker. All data were run on the same column, starting at low ionic strength and increasing to 100 mM ionic strength. At 0 mM ionic strength, there was both significant retention of all analytes on the column and, more interestingly, the elution is stretched out over a very broad time range, indicative of significant non-specific binding. Use of 2 mM ionic strength (see above) leads to a sharper elution profile, but causes significant retention of the compounds, including folic acid, by up to several minutes. On the other hand, the compounds elute at earlier times (based on the time to reach 50% of full intensity) and over a much narrower range when using either 50 mM or 100 mM ionic strength, indicating that the non-specific binding has been suppressed. An important point from these experiments is that even at 100 mM ionic strength it was possible to deposit the LC eluent satisfactorily using the nebulizer assisted electrospray method. Furthermore, the use of ammonium acetate as the buffer did not produce significant adduct ions, allowing identical MRM transitions to be used regardless of the concentration of buffer used. On the other hand, discrete spotting of the 100 mM sample lead to most of the matrix/buffer depositing at the edge of the spots (data not shown), leading to significant irreproducibility in the signal and noise levels for MALDI analysis.

Figure 10:
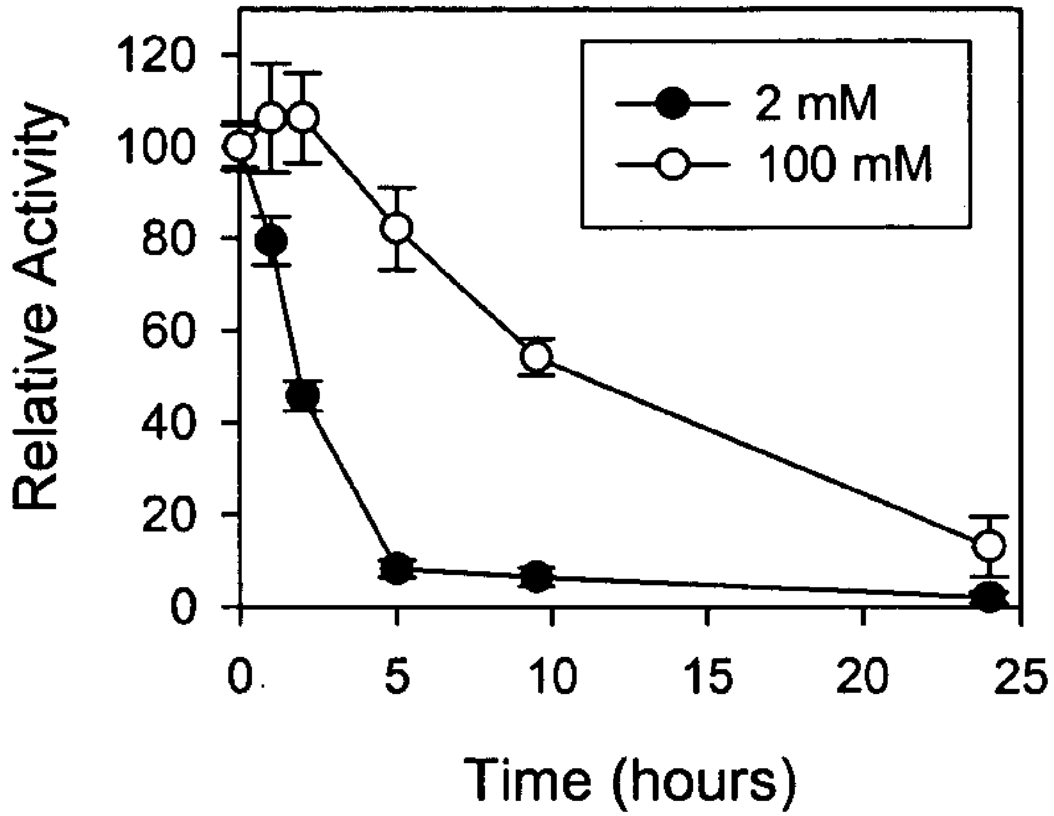
FIG. 10 shows the activity of DHFR as a function of incubation time in 2 mM and 100 mM ammonium acetate buffer solutions.

Another factor that is dependent on ionic strength is retention of activity of the entrapped protein, which determines whether the bioaffinity column can be reused. Previous studies using FAC-ESI/MS/MS with DHFR columns showed that the use of 2 mM ionic strength resulted in significant decreases in column performance owing to the low stability of DHFR in 2 mM ammonium acetate.[9] FIG. 10 shows that the DHFR protein retains full activity after 2 h incubation in 100 mM ammonium acetate, but retains less that half of its initial activity after a similar time in the presence of 2 mM ammonium acetate. After 5 h, the protein retains >80% activity in 100 mM buffer, but less than 10% activity in 2 mM buffer. These incubation times correspond to the longest runtimes that would normally be associated with FAC, and clearly demonstrate that the use of high ionic strength buffers, which are only compatible with MALDI/MS, should result in retention of activity over the required run-time of the FAC experiment.

The effects of high ionic strength on the reusability of the monolithic DHFR columns was studied. A FAC-MALDI/MS/MS trace was obtained for the initial run of the column using 50 nM of folic acid, pyrimethamine and trimethoprim in 100 mM ammonium acetate, the recovery run obtained using 100 mM ammonium acetate, and the second run of the same column under identical conditions to those used in the initial run. While there is a small decrease in retention time between the first and second runs, the overall performance of the column when using 100 mM ionic strength is far superior to that obtained when using 2 mM ionic strength. For example, the retention time for both trimethoprim and pyrimethamine decreases by only 20% (11.5 to 10 mm for trimethoprim, 16.5 to 13.5 mm for pyrimethamine) at 100 mM ionic strength, whereas decreases close to 85% in retention time were obtained at 2 mM ionic strength.[9] It is also noteworthy that the retention time for all compounds at 100 mM ionic strength was significantly shorter than was obtained at 2 mM. In part this was due to the use of a shorter column for the latter experiments (5 cm vs. 6 cm), but was likely also due to lower non-specific binding and perhaps also changes in dissociation constants that may have occurred as a result of the higher ionic strength. Although a shift of 20% in retention time between runs is still relatively large, such losses may be due to slow leakage of loosely entrapped protein rather than denaturation of protein. Further optimization of the column in terms of pore morphology may allow for further improvements in column reuse, and when coupled with the ability to run the FAC studies at high ionic strength, as demonstrated above, it may be possible to reuse such columns several times.

Discussion for Examples 1 and 2

Capillary scale meso/macroporous sol-gel based monolithic bioaffinity columns are ideally suited for the screening of compound mixtures using frontal affinity chromatography with mass spectrometric detection for identification of specific compounds in the mixture. A particular advantage of the sol-gel derived columns is their good compatibility with a variety of different proteins. While the current work focused on entrapment of a soluble enzyme, the sol-gel method employed herein is also amenable to the entrapment of a wide range of important drug targets, including membrane-bound enzymes[28] and receptors,[33] and even whole cells.[34] Furthermore, entrapment into DGS derived materials allows immobilization of labile enzymes, such as Factor Xa and Cox-II,[28] which are difficult to immobilize by other methods. Thus, the monolithic columns may find use in screening of compound mixtures against a wide variety of useful targets.

Another advantage of the low i.d. monolithic columns is the ability to interface the capillary columns directly to an ESI or MALDI mass spectrometer, which is likely to make them suitable for HTS of compound mixtures using FAC/MS. In particular, the low i.d. of the present monolithic columns allows them to deposit a relatively thin stream of analyte on a MALDI plate, allowing for high density deposition (up to 12 traces per plate). The time capacity of a MALDI plate is determined by the width of the deposited track as well as its deposition speed. Reducing the deposition speed will increase the plate capacity but it will also degrade the LC resolution as material eluted at any instant in time is deposited over a finite area, given by the spray diameter, and the overlap of two adjacent events increases. Since the spray diameter directly affects both the capacity of a plate and fidelity of the chromatography record, it is important to keep it as small as possible. In practical terms, the loss of chromatographic resolution that can be tolerated dictates the lowest deposition speed. Since the LC run and analysis are now decoupled into two time independent events, the ratio between deposition and interrogation speed determines how many re-runs and different analysis experiments can be performed over a track at a time, saving significant time over an LC re-run.

Certain parameters with the FAC-MALDI/MS/MS method reported herein may be optimized to enhance performance. For example, deposition methods that can produce narrower, less disperse traces would provide a higher density of analyte on the plate.[35] This should lead to a higher analyte concentration in the laser beam and thus a better LOD. Lower diameter columns may allow faster LC separations with lower flowrates that are compatible with deposition of thin tracks on the MALDI target. In addition to thinner columns, methods to suppress the inherent background from the MALDI matrix would minimize the need for subtraction of matrix background signals from analyte signals. While this is less of a problem when using MRM mode, and indeed was not required in the current study, such methods could be used with drug compounds that have product ions that are similar in structure to commonly used MALDI matrix species.

An advantage of MALDI/MS relative to ESI/MS for FAC studies is the ability to use much higher ionic strength buffers during the FAC run. The activity of proteins is known to be highly dependent on factors such as solution pH and ionic strength, and in most cases maximum activity is obtained using buffers that mimic physiological conditions (i.e., 20-50 mM buffer, 100 mM KCl, pH ~7.4). Furthermore, high ionic strength provides a more effective double layer, which better screens the charge of the anionic silica surface, and thus reduces electrostatic interactions between the charged analytes and the silica surface. In the present study, $Na^+$ and $K^+$ were avoided to minimize issues with adduct ion formation. Instead, ammonium acetate, which is a volatile buffer, was chosen to adjust ionic strength. The use of this buffer did not lead to the formation of adduct ions, and provided conditions that were amenable to LC deposition even at 100 mM concentrations. It is possible that even higher levels of ammonium acetate could be used for FAC/MALDI, but such levels were not examined in this study. As shown above, the use of high ionic strength led to the expected decreases in non-specific binding and also produced better retention of protein activity upon repeated use of the column. This clearly shows that use of MALDI/MS has significant advantages over ESI/MS for FAC studies using protein-doped columns.

The use of MALDI/MS/MS provides significant advantages over ESI/MS/MS for frontal affinity chromatography studies. MALDI/MS/MS provides better tolerance of high ionic strength buffers, less ion suppression, faster MS analysis times, access to more modes of MS analysis per LC run, and potentially offers the ability to acquire data using different mass analyzers (triple-quadrupole, TOF, TOF-TOF, Q-TOF, Ion Trap, FT-MS) from the same sample, which could be beneficial in cases where higher molecular weight species are analyzed. These advantages lead to the ability to perform frontal affinity chromatography under conditions that more closely mimic physiological conditions, leading to better retention of activity for the immobilized proteins and likely providing more reliable binding constant data. The ability to perform multiple MS analyses per LC run can be used advantageously to optimize detection of low concentration analytes or to identify unknown compounds that might be present in a natural product library or similar compound mixture. In ESI/MS, the MRM transitions, and hence the identity, of compounds must be know prior to the FAC run. Otherwise, unknown compounds must be identified indirectly using an indicator compound in "roll-up" mode, with compound identification done off-line. As shown herein, such roll-up effects can be confused with ion-suppression when using ESI/MS/MS, leading to difficulties in identifying true "hits" when using indicator mode. MALDI/MS/MS minimizes these problems, making the indicator mode more reliable, and also allows full MS analysis of deposited analytes, aiding in identification of unknowns. Overall, the results of this study show that MALDI/MS/MS can provide numerous advantages over ESI/MS/MS when used in conjunction with FAC, providing an improved method for LC/MS based high-throughput screening.

While the present invention has been described with reference to the above examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Effect of Analyte:
Matrix ratio on signal above background per unit of analyte.

| CHCA volume added to a unit volume of analyte | total signal (counts) above background signal per unit of analyte: folic acid | trimethoprim | pyrimethamine | fluorescein |
|---|---|---|---|---|
| 0.333 | 81659 | 38619 | 17422 | 0 |
| 1.0 | 49082 | 39611 | 15100 | 13431 |
| 3.0 | 26827 | 24357 | 15111 | 0 |

TABLE 2

Signal rate (cps) above a blank background for MS/MS analysis by MALDI and ESI ionization methods using 2 mM or 100 mM ammonium acetate buffer.

| | Folic acid | Trimethoprim | Pyrimethamine |
|---|---|---|---|
| MALDI 2 mM AA | 7400 | 42000 | 20000 |
| MALDI 100 mM AA | 1000 | 6000 | 3000 |
| ESI (5 μL/min) 2 mM AA | 350 | 6500 | 3600 |

TABLE 3

Total signal (counts) above background generated by 1 pg of analyte in 2 mM buffer.

| | Folic acid | Trimethoprim | Pyrimethamine |
|---|---|---|---|
| MALDI | 120000 | 180000 | 85000 |
| ESI (5 μL/min) | 350 | 6500 | 3700 |

FULL CITATIONS FOR DOCUMENTS REFERRED TO IN THE SPECIFICATION

[1]. a) Hage, D. S. *J. Chromatog. B* 1998, 715, 3-38 b) Hage, D. S.; *Clin. Chem.* 1999, 45, 593-615; c) Weller, M. G. *Fresenius J. Anal. Chem.* 2000, 366, 635-645; d) Muronetz, V. I.; Sholukh, M.; Korpela, T. *J. Biochem. Biophys. Methods* 2001, 49, 29-47; e) Baczek, T.; Kaliszan, R. *J. Biochem. Biophys. Methods* 2001, 49, 83-98; f) Burgess, R. R.; Thompson, N. E. *Curr. Opin. Biotechnol.* 2002, 13, 304-308.

[2]. a) Hage, D. S.; Noctor, T. A. G.; Wainer, I. W. *J. Chromatogr. A* 1995, 693, 23-32; b) Hofstetter, H.; Hofstetter, O. Schurig, V. *J. Microcolumn September* 1998, 10, 287-291; c) Hofstetter, O.; Lindstrom, H.; Hofstetter, H. *Anal. Chem.* 2002, 74, 2119-2125. d) Fitos, I.; Visy, J.; Simonyi, M. *J. Biochem. Biophys. Methods* 2002, 54, 71-84.

[3]. a) Hsieh, Y. L.; Wang, H.; Elicone, C.; Mark, J.; Martin, S. A.; Regnier, F. *Anal. Chem.*1996, 68, 455-462; b) Wang, C.; Oleschuk, R.; Ouchen, F.; Li, J.; Thibault, P.; Harrison, D. J. *Rapid. Commun. Mass. Spectrom.* 2000, 14, 1377-1383; c) Wang, S.; Regnier, F. E.*J. Chromatogr. A* 2001, 913, 429-436; d) Peterson, D. S.; Rohr, T.; Svec, F.; Frechet, J. M. J. *J. Proteome Res.* 2002, 1, 563-568; e) Peterson, D. S.; Rohr, T.; Svec, F.; Frechet, J. M. *J. Anal. Chem.* 2002, 74, 4081-4088; f) Slysz, G. W.; Schriemer, D. C. *Rapid Commun. Mass Spec.* 2003, 17, 1044-1050.

[4]. Prazeres, D.; Miguel F.; Cabral, J. M. S. in: *Multiphase Bioreactor Design*, Cabral, J. M. S.; Mota, M.; Tramper, J. (Eds.) Taylor & Francis Ltd., London, UK, 2001, pp. 135-180.

[5]. a) Schriemer, D. C.; Bundle, D. R.; Li, L.; Hindsgaul, O. *Angew. Chem., Int. Ed. Engl.* 1998, 37, 3383; b) Zhang, B.; Palcic, M. M.; Schriemer, D. C.; Alvarez-Manilla, G.; Pierce, M.; Hindsgaul, O. *Anal. Biochem.* 2001, 299, 173-182.

[6]. a) Baynham, M. T.; Patel, S.; Moaddel, R.; Wainer, I. W.; *J. Chromatogr. B* 2002, 772, 155-161; b) Moaddel, R.; Lu, L.; Baynham, M.; Wainer, I. W. *J. Chromatogr. B* 2002, 768, 41-53; c) Moaddel, R.; Cloix, J.-F.; Ertem, G.; Wainer, I. W. *Pharmaceut. Res.*2002, 19, 104-107; d) Moaddel, R.; Wainer, I. W.; *J. Pharmaceut. Biomed. Anal.* 2003, 30, 1715-1724.

[7]. Hodgson, R. J.; Brook, M. A.; Brennan, J. D. *Anal. Chem.* 2005, submitted.

[8]. Schriemer, D. C. *Anal. Chem.* 2004, 76, 440A.

[9]. Hodgson, R. J.; Chen, Y.; Zhang, Z.; Tleugabulova, D.; Long, H.; Zhao, X.; Organ, M.; Brook, M. A.; Brennan, J. D.; *Anal. Chem.* 2004, 76, 2780-2790.

[10]. Annesley, T. M. *Clin. Chem.* 2003, 49, 1041-1044.

[11]. Walker, K. L.; Chiu, R. W.; Monnig, C. A.; Wilkins, C. L. *Anal. Chem.* 1995, 67, 4197-4204

[12]. Zuberovic, A.; Ullsten, S.; Hellman, U.; Markides, K. E.; Bergquist, J. Rapid Commun. Mass Spectrom. 2004, 18, 2946-2952.

[13]. Teleger, T. J.; Mechref, Y.; Boraas, K.; Reilly, J. P.; Novotny, M. V. *Anal. Chem.* 2004, 76, 6698-6706.

[14]. Weinmann, W.; Parker, C. E.; Deterding, L. J.; Papac, D. I.; Hoyes, J.; Przybylski, M.; Tomer, K. B. *J. Chromatogr. A* 1994, 680, 353-361.

[15]. Zhang, H. Y.; Caprioli, R. M. *J. Mass Spectrom.* 1996, 31, 1039-1046.

[16]. Zhang, H. Y.; Stoeckli, M.; Andren, P. E.; Caprioli, R. M. *J. Mass Spectrom.* 1999, 34, 377-383.

[17]. Bogan, M. J.; Agnes, G. R. *Rapid Commun. Mass Spectrom.* 2004, 18, 2673-2681.

[18]. Zhang, B.; McDonald, C.;. Li, L. *Anal. Chem.* 2004, 76, 992-1001.

[19]. Miliotis, T.; Kjellström, S.; Nilsson, J.; Laurell, T.; Edholm, L.-E.; Marko-Varga, G. *J. Mass. Spectrom.* 2000, 35, 369-377.

[20]. Miliotis, T.; Ericsson, P.-O.; Marko-Varga, G.; Svensson, R.; Nilsson, J.; Laurell, T.; Bischoff, R. *J. Chromatogr., B* 2001, 752, 323-334.

[21]. Preisler, J.; Hu, P.; Rejtar, T.; Moskovets, E.; Karger, B. L. *Anal. Chem.* 2002, 74, 17-25.

[22]. Ericson, C.; Phung, Q. T.; Horn, D. M.; Peters, E. C.; Fitchett, J. R.; Ficarro, S. B.; Salomon, A. R.; Brill, L. M.; Brock, A. *Anal. Chem.* 2003, 75, 2309-2315.

[23]. Lou, X.; van Dongen, J. L. *J. Mass Spectrom.* 2000, 35, 1308-1312.

[24]. Fung, K. Y. C.; Askovic, S.; Basile, F.; Duncan, M. W. *Proteomics* 2004, 4, 3121-3127.

[25]. Wall, D. B.; Berger, S. J.; Finch, J. W.; Cohen, S. A.; Richardson, K.; Chapman, R.; Drabble, D.; Brown, J.; Gostick, D. *Electrophoresis* 2002, 23, 3193-3204.

[26]. Brook, M. A.; Chen, Y.; Guo, K.; Zhang, Z.; Jin, W.; Deisingh, A.; Cruz-Aguado, J.; Brennan, J. D. *J. Sol-Gel Sci. Technol.* 2004, 31, 343-348.

[27]. Zolli-Juran, M.; Cechetto, J. D.; Harlen, H.; Daigle, D. M.; Brown, E. D. *Bioorg. Med. Chem. Lett.* 2003, 13, 2493.

[28]. Besanger, T. R.; Chen, Y.; Deisingh, A. K.; Hodgson, R.; Jin, W.; Mayer, S.; Brook, M. A.; Brennan, J. D. *Anal. Chem.* 2003, 75, 2382-2391.

[29]. King, R.; Bonfiglio, R.; Fernandez-Metzier, C.; Miller-Stein, C.; Olah, T. *J. Am. Mass. Spectrom.* 2000, 11, 942-950.

[30]. Matuszewski, B. K.; Constanzer, M. L.; Chavez-Eng, C. M. *Anal. Chem.* 1998, 70, 882-889.

[31]. Krause, E.; Wenschuh, H.; Jungblut, P. R. *Anal. Chem.* 1999, 71, 4160-4165.

[32]. Gharahdaghi, F.; Kirchner, M.; Fernandez, J.; Mische, S. M. *Anal. Biochem.* 1996, 233, 94-99.

[33]. Besagner, T. R.; Easwaramoorthy, B.; Brennan, J. D. *Anal Chem.* 2004, 76, 6470-6475.

[34]. Livage, J.; Coradin, T.; Roux, C. *J. Phys.: Condens. Matter* 2001, 13, R673.

[35]. Chen, H.-S.; Rejtar, T.; Andreev, V.; Moskovets, E.; Karger, B. L. *Anal. Chem.* 2005, asap article DOI: 10.1021/ac048322z.

We claim:

1. A system for analyzing chemical samples comprising a frontal affinity chromatographic (FAC) column interfaced to a matrix-assisted laser desorption ionization (MALDI) mass spectrometer, wherein an effluent stream from the FAC column is combined with a MALDI matrix material, and the combination of the effluent stream and MALDI matrix material is directly deposited on a surface using a method suitable for substantially drying said combination prior to deposition on said surface.

2. The system according to claim 1, wherein the combination is deposited on a MALDI-MS plate.

3. The system according to claim 2, wherein the combination is deposited as discrete spots or as a continuous track.

4. The system according to claim 3, wherein the combination is deposited as a continuous track.

5. The system according to claim 2, wherein the MALDI plate is moved under the control of a computer.

6. The system according to claim 1, wherein the FAC column is a bioaffinity capillary column.

7. The system according to claim 6, wherein FAC column comprises a monolithic silica matrix.

8. The system according to claim 7, wherein, the monolithic silica matrix is prepared using sol-gel techniques.

9. The system according to claim 7, wherein the monolithic silica matrix is prepared using biomolecule compatible techniques.

10. The system according to claim 1, wherein the FAC column comprises one or more biological molecules entrapped therein or immobilized thereon.

11. The system according to claim 1, wherein the chemical sample comprises a library of compounds or an extract from a natural source.

12. A method of analyzing chemical samples from frontal affinity chromatography (FAC) comprising:

(a) combining effluent from a FAC column with a MALDI matrix material;

(b) directly depositing the combination in (a) on to a surface; and (c) analyzing the deposited combination using MALDI mass spectrometry, wherein the combination in (a) is directly deposited on the surface using a method suitable for substantially drying said combination prior to deposition on said surface.

13. The system according to claim 1, wherein the combination is deposited on said surface using a near-dry spraying method.

14. The system according to claim 1, wherein the combination is deposited on said surface using nebulizer assisted direct deposition.

15. The system according to claim 1, wherein the combination is continuously deposited said surface.

16. The system according to claim 1, wherein the MALDI mass spectrometer is off-line from the FAC column.

17. The method according to claim 12, wherein the combination is deposited on said surface using a near-dry spraying method.

18. The method according to claim 17, wherein the combination is deposited on said surface using nebulizer assisted direct deposition.

19. The method according to claim 12, wherein the combination in (a) is continuously deposited on to said surface.

20. The method according to claim 12, wherein the MALDI mass spectrometer is off-line from the FAC column.

* * * * *